Feb. 25, 1958　　　H. GELLING　　　2,824,691
ACTUATING MECHANISM FOR CALCULATING MACHINES
Filed Dec. 27, 1955
*Fig. 1*
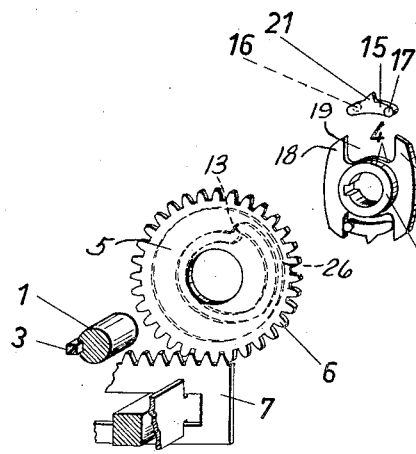
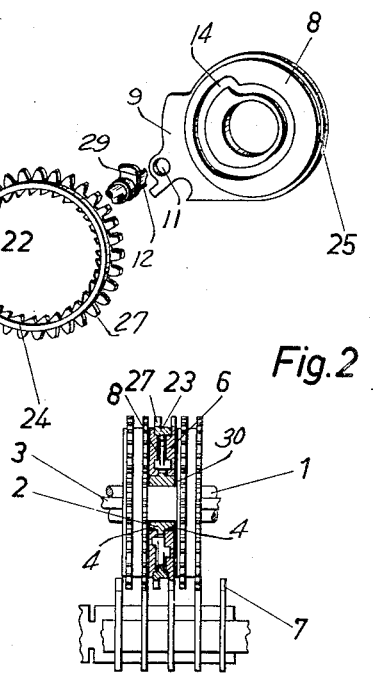
*Fig. 2*
*Fig. 3*
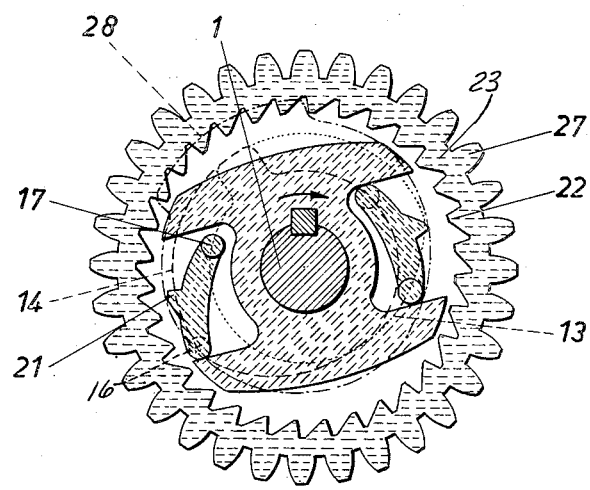
Inventor
Helmut Gelling

United States Patent Office 2,824,691
Patented Feb. 25, 1958

2,824,691

ACTUATING MECHANISM FOR CALCULATING MACHINES

Helmut Gelling, Ulm, Germany, assignor to Walther Büromaschinen Gesellschaft m. b. H., Gerstetten, Wurttemberg, Germany, a firm Application December 27, 1955, Serial No. 555,737

Claims priority, application Germany January 7, 1955

8 Claims. (Cl. 235—61)

The invention relates to an actuating mechanism for calculating machines having in each denomination a stationary cam and a cam adjustable according to a set digital value by which the engagement of a pawl with an driven member will be controlled according to the value to be set.

Known differential mechanisms of this kind are provided with spring actuated pawls which by means of pins are pivoted on a revolving member and cooperate under the action of their springs with the non-circular circumferential faces of stationary and adjustable cam discs.

The pawl which is movably guided on the revolving member in a radial direction engages, according to the invention, by means of a pin a stationary cam groove and by means of a second pin spaced from the other pin an adjustable cam groove whereby, upon the radial movement of one of the pins by its cam groove, the other pin acts as the pivot of the pawl.

From this construction it results that the pawl upon engaging and disengaging the driven member is always guided positively and overthrow or lagging of the pawl is impossible.

The two cam grooves may be located in a common radial plane. They may be arranged also on a cylindrical circumference so as to move the pawl in the direction of the axis of the cylinder. A particularly serviceable and space-saving construction is obtained in that the two pins are located on opposite side faces of the pawl and engage two endless cam grooves. These cam grooves are formed in a stationary and an adjustable cam disc and face towards each other. A driven actuating ring is supported on the circumference of the said cam discs and cooperates with the pawl. The differential movement of the actuating ring is transmitted by external gear teeth thereon. The distance between adjacent denominations which is attained in this manner will be substantially smaller than that with known actuating mechanisms of this kind or of cam disc and pin wheel setting devices.

Further objects of the invention will be discerned from the following description of an embodiment of the invention.

In the accompanying drawing:

Fig. 1 is an exploded perspective view of a denomination of the differential mechanism.

Fig. 2 is a front elevation of the differential mechanism with a denomination in section.

Fig. 3 is a sectional view of the differential mechanism illustrating the path of movement of the pawl.

On a cyclically operable driving shaft 1, driven by means of a clutch coupling for one revolution, a driving bush 2 is fixed in each denomination by means of a key 3, this bush having two circumferential faces 4 one of which serves as bearing face for a cam disc 5 which engages with its outer gearing 6 into a differential member 7 movable from one to nine units according to the value set by the keys or setting pins, thereby causing a corresponding rotational setting of the cam disc 5.

The other circumferential face 4 engages the central hole of a cam disc 8 having a projection 9 which is provided with a boring 11 through which a stationary bar 12 passes, whereby the cam disc 8 is held non-rotatably in relation to the shaft 1. The discs 5 and 8 are each provided with an endless cam groove 13 and 14, respectively, facing towards each other and in which a joint pawl 15 engages with pins 16, 17 on its oppositely lying side faces. The pawl is guided radially in a recess 19 formed by projections 18 of the driving bush 2, in such a manner, that it participates in the revolution of the shaft 1, moving thereby, according to the shape of the cam grooves 13, 14, with the one or the other of its ends outwards or inwards. The pawl 15 is provided with a pawl nose 21 between the two spaced pins 16 and 17 which cooperates with the ratchet teeth 22 of an actuating ring 23 turnably journaled on circumferential faces 25, 26 of the stationary and the adjustable disc 8 and 5, respectively, by means of inner faces 24 arranged on either side of the actuating ring 23.

The actuating ring 23 is provided with external gear teeth 27 which transmit the values from the differential to the totalizer or other mechanisms of the machine. During its revolution the pawl 15 is actuated by the cam grooves 13, 14 in such a manner that either the pin 16 or the pin 17 is moved inwards or outwards whereby the pin not moved serves as a pivot for the pawl. As long as both pins are engaged with the parts of the cam grooves being situated farthest outward the nose 21 of the pawl engages the inner ratchet teeth 22. When one of the two pins leaves the most outwards lying part of one of the two cam grooves the engagement of the nose 21 with the inner gearing 22 will be terminated.

In Fig. 3 the path 28 of the nose 21 of the pawl is represented by the dash and dotted line, the form of the cam groove 13 by the dotted line and the form of the cam groove 14 by the dashed line. With the adjustment of the cam groove 13 assumed in Fig. 3 the actuating ring 23 will be moved by six units. On clockwise movement of the cam groove disc 13 the number of moved units diminishes while upon movement of the cam groove disc 13 in counter clockwise direction this number increases.

In order to keep the actuating ring in the attained end position of adjustment and to prevent to overthrow a spring influenced blocking pawl 29 (Fig. 1) cooperates with the external gearing 27. Said blocking pawl 29 is pivoted on the bar 12 (Fig. 1), engaging gearing 27 from below and yieldingly blocking it.

In the above description it is assumed that the driving shaft performs one revolution during each adding operation and that only one pawl 15 is provided which brings about the progressive advance of the actuating ring 23 by zero to nine units during a fraction of the revolution and that the balance of each revolution of the shaft 1 may be used for a slowly working tens-carrying mechanism and the like.

In the embodiment represented in the description two pawls 15 are provided which can perform in cooperation with the cam grooves 13 and 14 two adding operations during each revolution of the driving shaft 1. For this purpose the shaft 1 makes half a revolution during each adding operation. As the actuating ring 23 has 32 teeth an angle at the centre according to about seven teeth is thereby available for the performance of a quick working tens-carrying mechanism. If the driving shaft is interrupted accordingly or driven non uniformly a slowly working tens-carrying mechanism can be used with the arrangement of two pawls 15.

Of course it is possible that upon using a diameter of the actuating ring 23 accordingly enlarged more than two pawls can be used if the described differential mechanism should be applied to calculating machines of other kind, for instance multiplying machines.

On the other hand, for the same purpose, on using a single pawl, the outward parts of the cam groove 13, 14 may be accordingly multiplied.

It is evident, that the whole differential mechanism can be mounted in a simple manner by pinning together the several parts without screwing and riveting. Thin disc rings 30 (Fig. 2) will be inserted between the several denominational orders of the mechanism in order to diminish the friction between them.

What I claim is:

1. In an actuating mechanism for calculating machines comprising in each denomination, a cylindrically operable shaft, a drive element connected with said shaft for rotation therewith, a pawl supported by said drive element with limited freedom of movement in a radial direction and constrained by said drive element to move through an orbital path about said shaft, a driven member rotatably mounted about said shaft and operable by said pawl, a stationary disc having a cam groove, a settable disc having a cam groove and adapted to be rotatably adjusted differentially according to a set digital value, said pawl having two spaced pins each engaging one of said cam grooves, so that upon rocking the pawl by one of the cam grooves by means of the one pin the other pin serves as fulcrum for the pawl, whereby said pawl engages and drives said driven member differentially in accordance with the adjustment of said settable cam disc upon cyclic operation of said drive shaft.

2. In an actuating mechanism according to claim 1, and ratchet teeth on said driven member, a nose on said pawl cooperating with said ratchet teeth, said cam grooves being so shaped that upon rocking the pawl by both the cam grooves towards the driven member said nose engages the ratchet teeth of said driven member.

3. In an actuating mechanism according to claim 1, said two pins on the pawl being mounted on opposite sides of the pawl and engaging the two cam grooves located on side faces of their discs turned to each other, said driven member having the form of a ring journaled on the circumferential faces of the two cam groove discs.

4. In an actuating mechanism according to claim 1, said driven member having the form of a ring journaled on the circumferential faces of the stationary and the adjustable discs, internal ratchet teeth on the driven member cooperating with said pawl, and external gear teeth on the driven member for operating an accumulator mechanism.

5. In an actuating mechanism according to claim 1, said element comprising a bush fixed on the revolving shaft between said stationary and said settable cam groove disc, a recess in said bush receiving said pawl, said pawl being constrained by the walls of said recess to rotate with said bush but being free to move radially in said recess and two cylindrical faces on said bush serving as bearings for said cam groove discs.

6. In an actuating mechanism according to claim 1, a projection on said stationary cam groove disc, a bar stationarily fixed passing through said projections of all denominations in order to hold said stationary cam discs fixed against rotation.

7. In an actuating mechanism according to claim 1, a projection on said stationary cam groove disc, a bar stationarily fixed passing through said projections of all denominations in order to hold said stationary cam discs fixed against rotation, said driven member having the form of a ring, external gear teeth on said actuating ring for operating an accumulator mechanism, a spring-actuated detent cooperating with said gear teeth in order to prevent overthrow of said driven member said detent being pivotally mounted on said bar.

8. In an actuating mechanism according to claim 1, a plurality of said rockable pawls, all pawls being equally spaced round said revolving shaft, so that at each operation of the machine said shaft needs to be rotated only by a partial revolution accordingly.

References Cited in the file of this patent

UNITED STATES PATENTS

| | | |
|---|---|---|
| 1,027,160 | Trog | May 21, 1912 |
| 1,447,872 | Lake | Mar. 6, 1923 |
| 2,081,008 | Hamann | May 18, 1937 |
| 2,328,653 | Lake et al. | Sept. 7, 1943 |
| 2,387,870 | Avery | Oct. 30, 1945 |